O. C. FRICK.
FEEDING DEVICE FOR FEED CUTTERS.
APPLICATION FILED FEB. 14, 1913.

1,108,163.

Patented Aug. 25, 1914.

Witnesses

Inventor
Orlando C Frick
By Erwin E Wheeler
Attorneys

UNITED STATES PATENT OFFICE.

ORLANDO C. FRICK, OF MANITOWOC, WISCONSIN, ASSIGNOR TO SMALLEY MANUFACTURING COMPANY, OF MANITOWOC, WISCONSIN, A CORPORATION OF WISCONSIN.

FEEDING DEVICE FOR FEED-CUTTERS.

1,108,163.     Specification of Letters Patent.     Patented Aug. 25, 1914.

Application filed February 14, 1913. Serial No. 748,318.

*To all whom it may concern:*

Be it known that I, ORLANDO C. FRICK, a citizen of the United States, residing at Manitowoc, county of Manitowoc, and State of Wisconsin, have invented new and useful Improvements in Feeding Devices for Feed-Cutters, of which the following is a specification.

My invention relates to improvements in feeding devices for feed cutters.

The object of my invention is to provide improved means for forcing the material between the feed rollers.

Figure 1:
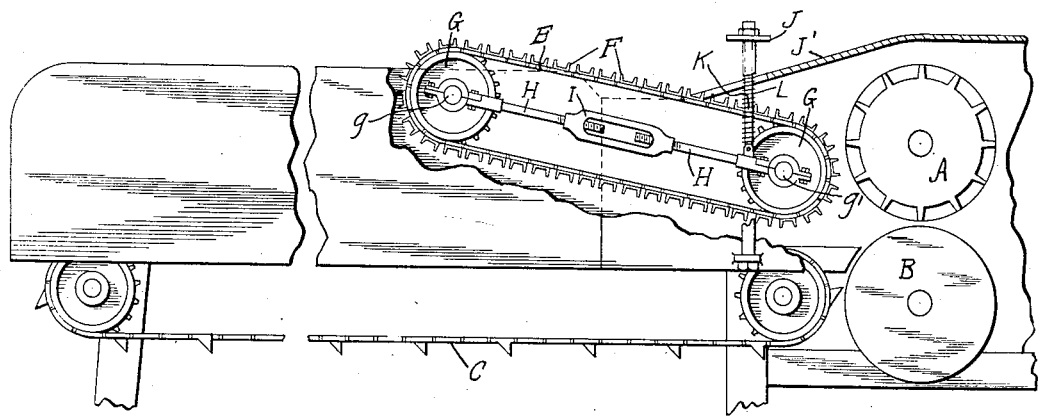
Figure 2:
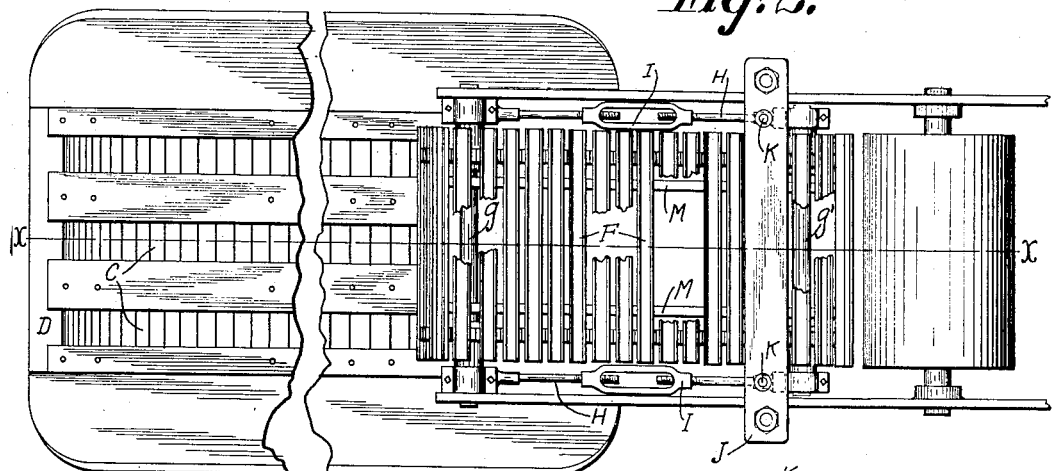
Figure 3:
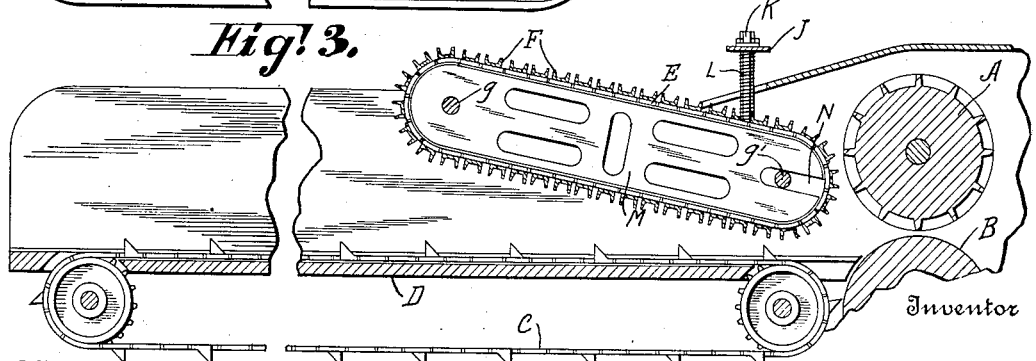
Figure 4:
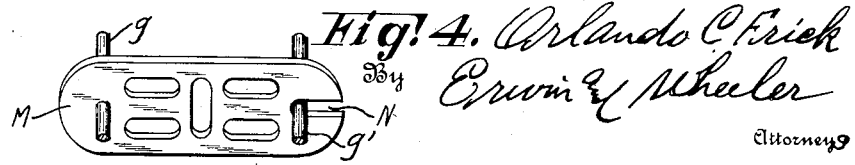

In the drawings—Figure 1 is a side elevation of the feeding portion of a feed cutter embodying my invention, the housing walls being shown in section. Fig. 2 is a plan view of the same. Fig. 3 is a longitudinal sectional view drawn on line $x$—$x$ of Fig. 2. Fig. 4 is a detail view (on a reduced scale) of one of the guides of the auxiliary conveyer, showing fragments of the shafts.

Like parts are identified by the same reference characters throughout the several views.

A and B are the feed rollers, and C is a belt conveyer which may be of any ordinary type, arranged to travel over a feed table D. This belt conveyer carries the material in the direction of the feed rollers. An auxiliary force feeding device is employed, which comprises a conveyer belt composed of sprocket chains E connected by cross bars or slats F, each comprising a U-bar secured to the chains with its side flanges projecting. The U bars engage the material and force it between the rollers A and B. The chains pass over end sprockets G, mounted on shafts $g$, $g'$ respectively. The driving shaft $g$ is journaled in the side walls of the feed table and the shaft $g'$ is spaced therefrom by strut rods H, formed in sections adjustably connected by a turn buckle I. The shaft $g'$ is a floating shaft which may move vertically and can be adjusted longitudinally by means of the turn buckles. A supporting member J, carried by housing J', is connected with the rods H by vertically movable rods K, with a compression spring L interposed to exert a downward pressure upon the rods H at their inner ends.

A pair of guides M are pivotally mounted upon the shaft $g$ between the sprocket wheels G thereon, and are provided with open ended slots N at their rear ends to receive the shaft $g'$, whereby the guides may be loosely supported from the shaft $g'$, without interfering with the adjustment of the shaft. These guides constitute supporting members for the conveyer belt, and as soon as the slats F are subjected to pressure, they will bear upon these guides and thus support the chains and prevent said chains from buckling and breaking under heavy strains. The auxiliary conveyer above described inclines downwardly and convergingly toward the main conveyer at or near its rear end to progressively compress the material on the main conveyer and force it between the feed rollers A and B. The springs L allow the lower or inner end of the auxiliary conveyer to yield resiliently, and thus relieve the pressure in case it becomes excessive. The springs have sufficient resistance, however, to maintain a heavy pressure upon the material and as the guides M prevent the chains from buckling or bending upwardly between the sprocket wheels, the material will be forced forwardly with a constant increase of pressure, and the chains will not be broken, as heretofore, where they have been permitted to bend upwardly under the pressure of the material which then tends to accumulate and cause the chains to draw abruptly downwardly around the rear sprocket wheel.

The guides M each comprise a flat plate of metal of sufficient thickness to provide an adequate bearing for the slats F upon its upper and lower margins, over which the slats may pass in frictional contact, although it is not necessary that the slats should be in actual contact therewith, except when they are slightly deflected by the pressure of the material. The chains are thus relieved of all strain except that exerted longitudinally in forcing the material to the feed rollers.

I claim—

In a floating auxiliary conveyer of the belt type, the combination with a fixed, forward, driving shaft, a rear end shaft floated from said driving shaft by adjustable strut rods and adapted to raise and lower under varying pressure of the material, and means for providing resilient downward pressure on the floating end of said conveyer,—of supporting guides journaled upon the driving shaft at one end and provided with open ended slots at the other wherein said floating shaft is mounted, endless conveyer chains carried by said shafts, and bearing cross slats adapted to travel along the upper and lower margins of said guides.

In testimony whereof I affix my signature in the presence of two witnesses.

ORLANDO C. FRICK.

Witnesses:
  A. L. HOUGEN,
  HILDA HENRIKSON.